(12) United States Patent
Roussely-Rousseau et al.

(10) Patent No.: US 10,329,912 B2
(45) Date of Patent: Jun. 25, 2019

(54) TURBINE ROTOR FOR A TURBOMACHINE (71) Applicant: SAFRAN AIRCRAFT ENGINES, Paris (FR)

(72) Inventors: Amaury Roussely-Rousseau, Toulouse (FR); Guy Burlet, Toulouse (FR); Jean Pierre Mareix, Chartrettes (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 850 days.

(21) Appl. No.: 14/423,536

(22) PCT Filed: Aug. 29, 2013

(86) PCT No.: PCT/FR2013/051995
§ 371 (c)(1),
(2) Date: Feb. 24, 2015

(87) PCT Pub. No.: WO2014/033408
PCT Pub. Date: Mar. 6, 2014

(65) Prior Publication Data
US 2015/0322796 A1    Nov. 12, 2015

(30) Foreign Application Priority Data

Sep. 3, 2012 (FR) ...................................... 12 58190

(51) Int. Cl.
*F01D 5/30* (2006.01)
*F01D 5/08* (2006.01)
*F01D 5/26* (2006.01)

(52) U.S. Cl.
CPC ............... *F01D 5/082* (2013.01); *F01D 5/26* (2013.01); *F01D 5/3007* (2013.01); *F05D 2260/201* (2013.01); *Y02T 50/676* (2013.01)

(58) Field of Classification Search
CPC .................................. F01D 5/082; F01D 5/26
See application file for complete search history.

(56) References Cited

U.S. PATENT DOCUMENTS 3,290,466 A    12/1966 Oliveau
4,457,668 A    7/1984 Hallinger
(Continued)

FOREIGN PATENT DOCUMENTS

EP    0062558 A1    10/1982
EP    1306523 A1    5/2003
(Continued)

OTHER PUBLICATIONS

International Search Report dated Dec. 20, 2013 in PCT/FR2013/051995 filed Aug. 29, 2013.

*Primary Examiner* — Kayla McCaffrey
(74) *Attorney, Agent, or Firm* — Oblon, McClelland, Maier & Neustadt, L.L.P.

(57) ABSTRACT

A turbine rotor for a turbomachine, including a disk containing slots for mounting vane roots, each slot being defined by two adjacent teeth of the disk, the vane roots including contact surfaces bearing on contact surfaces of the teeth of the disk. Foils are mounted on the teeth of the disk, each foil having a general U-shape including lateral bearing parts inserted between the corresponding contact surfaces of the vane roots and teeth of the disk, and a central part facing the peak of the corresponding tooth of the disk and defining a cavity between said peak and the foil. The turbine rotor also includes a device for supplying cooling air into said cavity.

12 Claims, 5 Drawing Sheets

(56) References Cited

U.S. PATENT DOCUMENTS

| | | | | |
|---|---|---|---|---|
| 5,281,097 A | * | 1/1994 | Wilson | F01D 5/081 |
| | | | | 415/115 |
| 5,800,124 A | * | 9/1998 | Zelesky | F01D 5/081 |
| | | | | 416/95 |
| 6,832,896 B1 | | 12/2004 | Goga et al. | |
| 8,616,832 B2 | * | 12/2013 | Smoke | F01D 5/087 |
| | | | | 415/115 |
| 2004/0258528 A1 | | 12/2004 | Goga et al. | |
| 2005/0232751 A1 | | 10/2005 | Townes et al. | |
| 2008/0226457 A1 | | 9/2008 | Belmonte | |
| 2009/0016890 A1 | | 1/2009 | Douguet et al. | |
| 2009/0060745 A1 | * | 3/2009 | Douguet | F01D 5/3007 |
| | | | | 416/219 R |
| 2012/0082568 A1 | | 4/2012 | Tibbott et al. | |

FOREIGN PATENT DOCUMENTS

| | | |
|---|---|---|
| EP | 1970538 A1 | 9/2008 |
| EP | 2014874 A1 | 1/2009 |
| EP | 2436879 A2 | 4/2012 |
| GB | 2409240 A | 6/2005 |
| JP | 59-99101 U | 7/1984 |
| JP | 7-8502 U | 2/1995 |
| JP | 2003-148102 A | 5/2003 |
| JP | 2008-232146 A | 10/2008 |
| JP | 2009-19630 A | 1/2009 |

* cited by examiner

TURBINE ROTOR FOR A TURBOMACHINE

BACKGROUND OF THE INVENTION

Field of the Invention

The present invention relates to a turbine rotor for a turbomachine, more particularly a low pressure turbine rotor.

Description of the Related Art

In a conventional turbine engine, the turbine rotor comprises disks the periphery of which is provided with slots for mounting the vane roots, with each slot being defined by two adjacent teeth of the disk. The vane roots comprise contact surfaces which, in operation, rest on the contact surfaces of the teeth of the disk under the effect of a centrifugal force.

The disks are centered on the axis of the turbomachine and are connected together and to a turbine shaft by flanges.

An upstream disk may comprise a downstream annular flange for fixing to an upstream annular flange of a downstream disk by screw-nut type means. An annular shroud is mounted between the upstream and downstream disks and surrounds at least the upstream flange of the downstream disk, so as to axially hold the vanes on the downstream disk by resting on the roots thereof with its downstream end portion. Such shroud further carries sealing elements intended to cooperate with blocks made of abradable material mounted on fixed vanes of a distributor located axially between the upstream and downstream disks mentioned above. The sealing elements and the blocks form sealing means of the labyrinth seal type.

When the upstream and downstream disks are secured together by their flanges, the shroud comprises an annular flange axially inserted between the flanges of the disk.

An annular space is defined between the shroud and the upstream flange of the downstream disk and is, upstream, supplied with cooling air which is guided to the slots of the downstream disk to ventilate these.

More particularly, the cooling air reaches a cavity at the bottom of the slot, between the vane root and the disk.

Studies carried out by the Applicant have shown the occurrence of high temperatures at the peaks of the teeth of the disk. Now, high temperatures in these areas subject to high stresses may cause creep. As a matter of fact, in operation and under the effect of a centrifugal force, the vane roots exert significant shear stresses, particularly in the areas of the contact surfaces.

Such creep substantially reduces the service life of the turbine disk and may impact the performances of the turbomachine.

In order to avoid such a phenomenon, a substantial cooling flow rate is generally provided at the bottom of the slots, so as to sufficiently cool the teeth of the disk. This cooling flow rate is however taken from the air from the compressor, and this affects the performances of the turbomachine.

BRIEF SUMMARY OF THE INVENTION

The invention more particularly aims at providing a simple, efficient and cost-effective solution to these problems.

To this end, it proposes a turbine rotor for a turbomachine, comprising a disk containing slots for mounting vane roots, with each slot being defined by two adjacent teeth of the disk, with the vane roots comprising contact surfaces bearing on contact surfaces of the teeth of the disk, characterized in that foils are mounted on the teeth of the disk, with each foil having a general U-shape comprising lateral bearing parts inserted between the corresponding contact surfaces of the vane roots and the teeth of the disk, and a central part facing the peak of the corresponding tooth of the disk and defining a cavity between said peak and the foil, with the turbine rotor comprising means for supplying cooling air into said cavity.

Cooling air is thus supplied, not in the background areas of the slots, but at the peaks of the teeth of the disk. A lower and better controlled air flow rate then makes it possible to efficiently cool the areas liable to be affected by creep. This makes it possible to increase the engine performances, since the bleed cooling air rate is smaller than in the prior art. The invention also substantially increases the service life of the disk, which is no longer exposed to creep phenomena.

According to one embodiment of the invention, the central part at least of each foil comprises at least one orifice for letting the cooling air through, with the means for supplying cooling air being adapted to supply cooling air radially outside goes through said orifice of the foil, before entering the cavity located between the corresponding tooth and the foil and impacting the peak of the tooth.

Impact cooling is relatively efficient and requires a relatively low cooling air flow rate.

The vanes preferably each comprise a platform carrying a blade connected via a tang to the vane root, with the tangs defining therebetween spaces accommodating dampers intended to rub on radially inner faces of the platforms of the vanes to dissipate the vibrations thereof, with the dampers forming cavities open in the upstream direction and open radially inwards, opposite the orifice letting the air through the foil, with cooling air being supplied from upstream into the cavities formed by the dampers and into the cavities formed between the foils and the teeth of the disk, through the orifices of the foils.

According to an alternative embodiment of the invention, the disk comprises an upstream flange surrounded by an annular shroud which defines, with the flange, an annular space for the circulation of cooling air, with the annular shroud having a downstream portion bearing on an upstream face the disk and forming a stop for holding the vane roots, with said downstream portion comprising channels supplying cooling air connecting the annular space defined between the upstream flange and the annular shroud and cavities formed by the dampers.

In this case, the upstream flange can close, upstream, the cavities formed by the dampers, with the air supplying channels of the downstream portion of the flange only opening upstream of the cavities formed by the dampers.

According to one characteristic of the invention, the turbine rotor comprises a downstream flange pressed against a downstream face of the disk so as to close, downstream, the cavities located between the teeth of the disk and the foils, with said downstream flange having calibrated orifices for discharging air out of said cavities.

The calibrated orifices make it possible to better control the cooling air flow rate.

According to another embodiment of the invention, the disk comprises an upstream flange surrounded by an upstream annular shroud with the flange defining an annular space for circulating cooling air, with the annular shroud having a downstream portion resting on an upstream face of the disk and forming a stop holding the vane roots, with said downstream portion comprising cooling air supplying channels connecting the annular space defined between the upstream flange and the annular shroud and the cavities formed between the foils and the teeth of the disk.

In this embodiment, the air does not radially go through the orifices of the foils but directly goes into the cavities located between the foils and the corresponding teeth of the disk, via the channels formed in the annular shroud.

In this case, the disk may also comprise cooling air supplying channels connecting the channels of the downstream part of the flange and the cavities formed between the foils and the teeth of the disk.

The channels supplying cooling air to the flange and/or the disk are preferably so calibrated as to control the cooling air flow rate.

The invention also relates to a turbomachine, such as an airplane turbojet or turboprop, characterized in that it comprises a turbine rotor of the above type.

BRIEF DESCRIPTION OF THE SEVERAL VIEWS OF THE DRAWINGS

The invention will be better understood, and other details, features and advantages of the invention will appear upon reading the following description given by way of non restrictive example while referring to the appended drawings wherein.

DETAILED DESCRIPTION OF THE INVENTION

Figure 1:
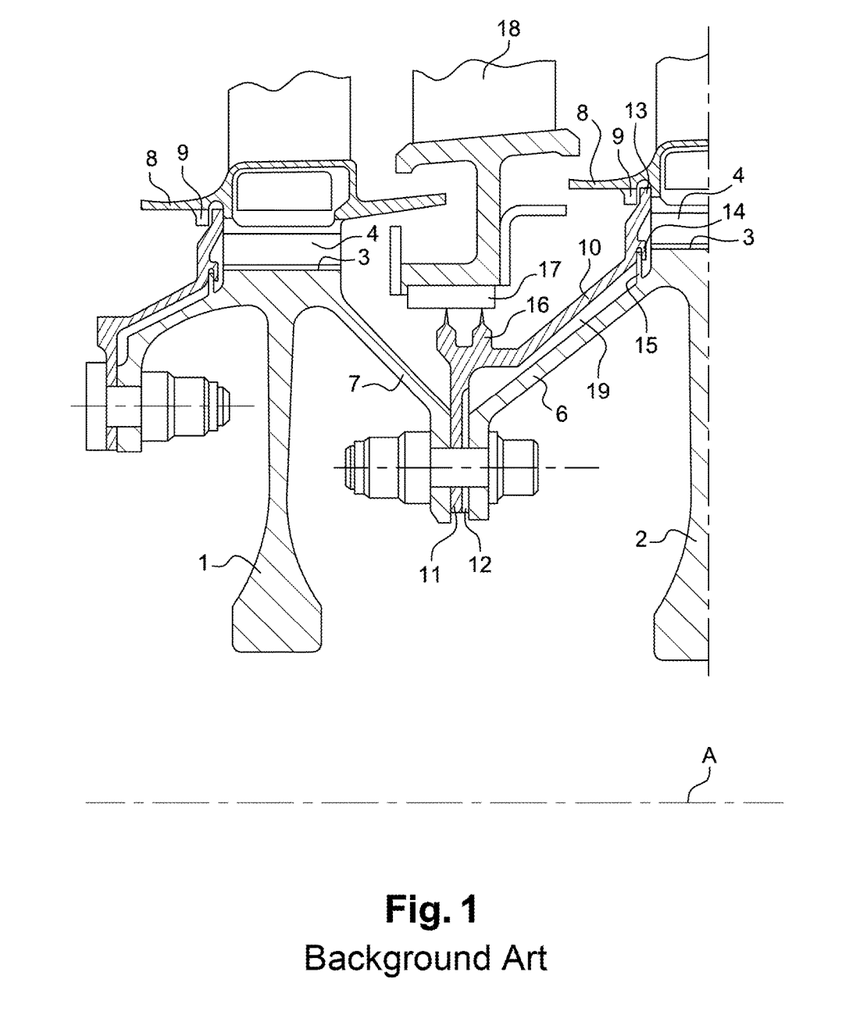
FIG. 1 is a half-view, in longitudinal cross-section, of a turbine rotor of the prior art.
Figure 2:
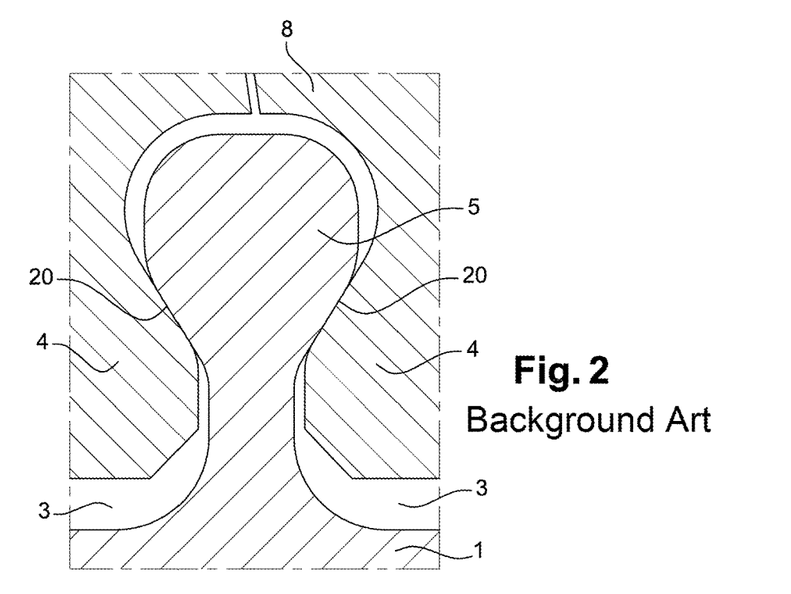
FIG. 2 is a cross-sectional view, along a radial plane, of a turbine rotor of the prior art.

Referring first to FIGS. 1 and 2, which show a lowpressure turbine rotor of the prior art, with such rotor having a plurality of disks 1, 2, on the periphery of which slots 3 for mounting the vanes roots 4 are formed. Each slot is defined by two adjacent teeth 5. The disks 1, 2 are centred on the A axis of the turbomachine and are connected together and to a turbine shaft by annular shrouds 6, 7. The vane roots 4 are surmounted by platforms 8 adjacent to each other so as to define the inner wall of a gas circulation pipe. Teeth 9 radially protrude inwardly from the platforms 8.

Only two disks, respectively upstream 1 and downstream 2, are shown in FIG. 1. The upstream disk 1 comprises a downstream annular flange 7 for fixing the downstream disk 6 to an upstream annular flange 2. The attachment is provided by bolts.

An annular shroud 10 for holding the vane roots 4 is mounted around the flange 6 and extends axially between the disks 1, 2 to the slots 3 of the downstream disk 2, so as to form axial stops for the vane roots 4 of this disk 2.

The shroud 10 has an inner annular flange 11 at the upstream end thereof which is axially inserted between the flanges 6, 7, and fixed thereto by bolts. The flange 11 comprises radial orifices 12 for letting the cooling air through.

The radially outer periphery of the shroud comprises teeth 13 cooperating with the teeth 9 of the platforms 8 so as to hold the shroud 10 in position. Additional attachment teeth 14, 15 are further provided respectively on the shroud 10 and on the disk 2.

The shroud 10 also carries sealing elements 16 intended to cooperate with blocks of abradable material 17 mounted on stationary vanes 18 of a distributor located axially between the disks 1, 2. The sealing elements 16 and the blocks 17 form sealing means of the labyrinth seal type.

The shroud 10 defines, with the flange 6 an annular space 19 for the circulation of ventilating air. The downstream face of the shroud 10 rests on the upstream face of the disk 2 so as to seal the annular space 19.

In operation, ventilation air enters through orifices 12 of the flange 11 into the annular space 19 formed between the shroud 10 and the flange 6 and is guided by the shroud 10 to the cavities located at the bottom of the slots 3 of the downstream disk 2, under the vane roots 4.

As indicated above, the cooling of such cavities does not make it possible to efficiently cool the zones of the teeth 5 and of the vane roots 4 exposed to high shear stresses, and which are located at the contact surfaces 20. There is thus a risk of creep in these areas, which may cause degradation of the disk 2. To avoid this, a significant cooling air flow rate should be provided at the bottom of the slots 3, which affects the performances of the turbomachine.

Figure 3:
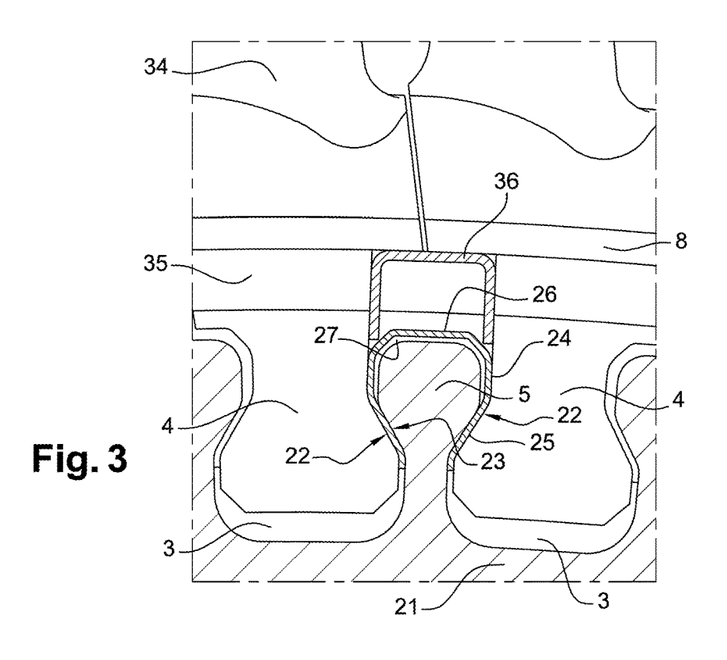
FIG. 3 is a cross-sectional view, along a radial plane, of a portion of a turbine rotor according to a first embodiment of the invention.
Figure 4:
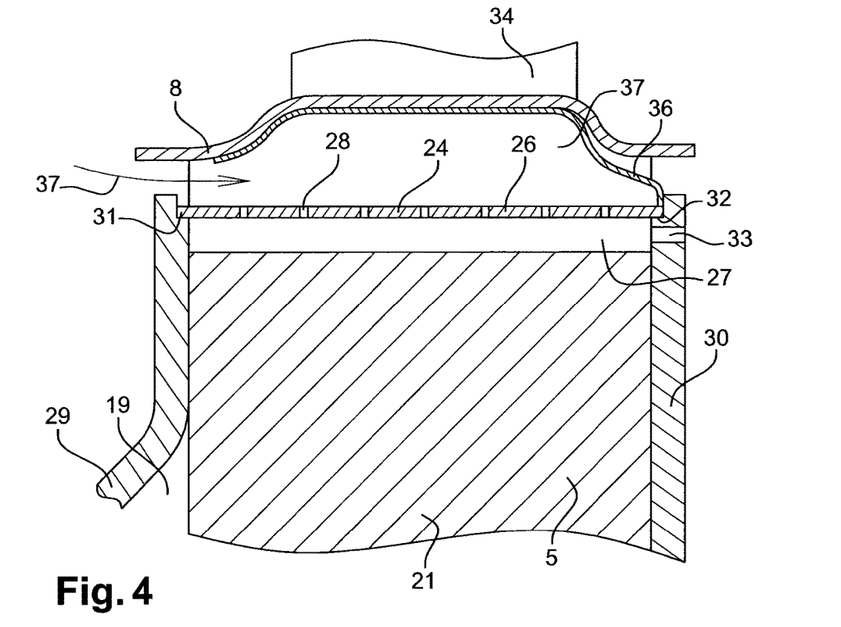
FIG. 4 is a longitudinal cross-sectional view of a portion of the turbine rotor of FIG. 3.

FIGS. 3 and 4 illustrate a low-pressure turbine rotor according to a first embodiment of the invention comprising a disk 21 having slots 3 used for mounting vane roots 4, with each slot 3 being defined by two adjacent teeth 5 of the disk 21, with the vane roots 4 having contact surfaces 22 bearing on contact surfaces 23 of the teeth 21 of the disk 5.

Foils 24 are mounted on the teeth 21 of the disk 5, with each foil 24 having a general inverted U shape comprising lateral bearing parts inserted between the corresponding contact surfaces of the vane roots and teeth of the disk, and a central part 26 facing the peak of the corresponding tooth 5 of the disk and defining a cavity 27 between said peak and the foil 24. The central part 26 of each foil 24 comprises radial orifices 28.

Like in the prior art, the disk 21 comprises an upstream flange surrounded by a shroud 29 which defines, with the flange, an annular space 19 for the circulation of cooling air, and used for holding the vane roots 4, in the upstream direction. The rotor further comprises a downstream shroud 30 pressed on a downstream face of the disk 21 and used for holding the vane roots 4, in the downstream direction.

The upstream edge of the central part 26 of each foil 24 is engaged in a shoulder 31 of the outer periphery of the upstream shroud 29 and the downstream edge of the central part 26 of each foil 24 is engaged in a shoulder 32 of the outer periphery of the downstream shroud 30. The cavity 27 is thus closed upstream and downstream, respectively by the upstream shroud 29 and the downstream shroud 30.

The downstream shroud 30 further comprises calibrated orifices 33 for discharging air out of said cavities 27.

The vanes each comprise a platform 8 carrying a blade 34 and connected by a tang 35 to the vane root 4, with the tangs 35 defining therebetween spaces for accommodating dampers 36 intended to rub on radially inner faces of the platforms 8 of the vanes to dissipate the vibrations thereof. Such dampers 36 are for example known from document FR 2,963,382, in the name of the Applicant.

The dampers 36 form cavities open in the upstream direction and radially open inwards, opposite the orifices 28.

In operation, air from the compressor flows from the upstream to the downstream direction, at a pressure greater than the gas flow circulating inside the pipe internally defined by the platforms of the vanes 8.

The air from the compressor then enters from upstream into the cavities 37 formed by the dampers 36 (arrow 38), then into the cavities 27 formed between the foils 24 and the teeth 5 of the disk 21, through the orifices 28 of the foils 24.

This air directly impacts the peaks of the teeth 21 of the disk 5, so as to cool these. The air contained in the cavities 27 then escapes in the downstream direction, through the orifices 33 of the downstream shroud 30.

Figure 5:
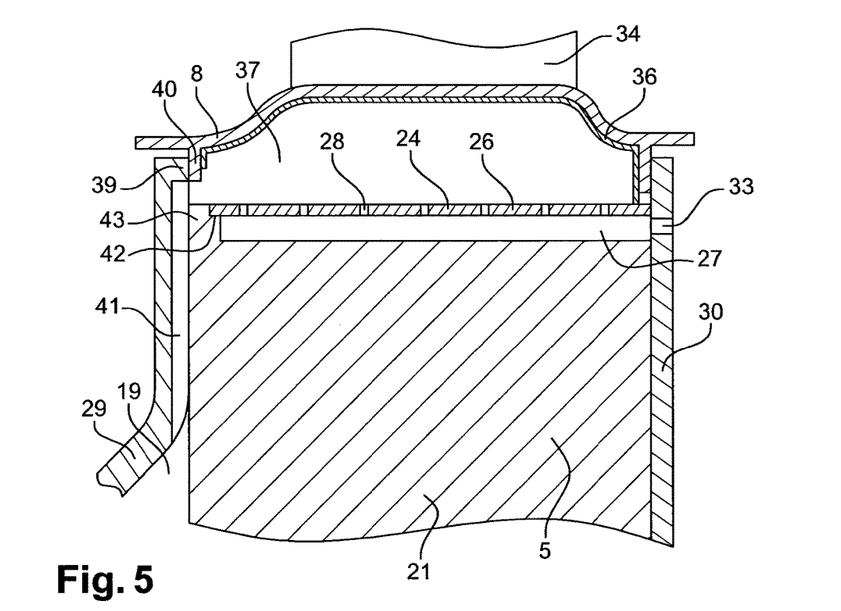
FIG. 5 is a view corresponding to FIG. 4, a second embodiment of the invention.

FIG. 5 illustrates a second embodiment of the invention, wherein the outer periphery 39 of the downstream portion of the upstream shroud 29 is radially extended outwardly until it sealingly rests on rims 40 extending radially inwardly from the platforms 8.

The downstream portion of the upstream shroud further comprises grooves 41 radially extending from the annular space 19 and opening upstream of the cavities 37.

In this embodiment, the upstream edge of the central part 26 of the foil 24 rests on a shoulder 42 formed in a protruding portion 43 of the disk 21. More particularly, the protruding part 43 radially extends outwardly from the peak of the tooth 5 of the disk 21.

In operation, the cooling air from the annular space 19 thus goes into the cavities 37 through the grooves 41 and then into the cavities 27 through the orifices 28, so as to cool the peaks of the teeth 5 of the disk 21. The air is then discharged downstream through the orifices 33.

Figure 6:
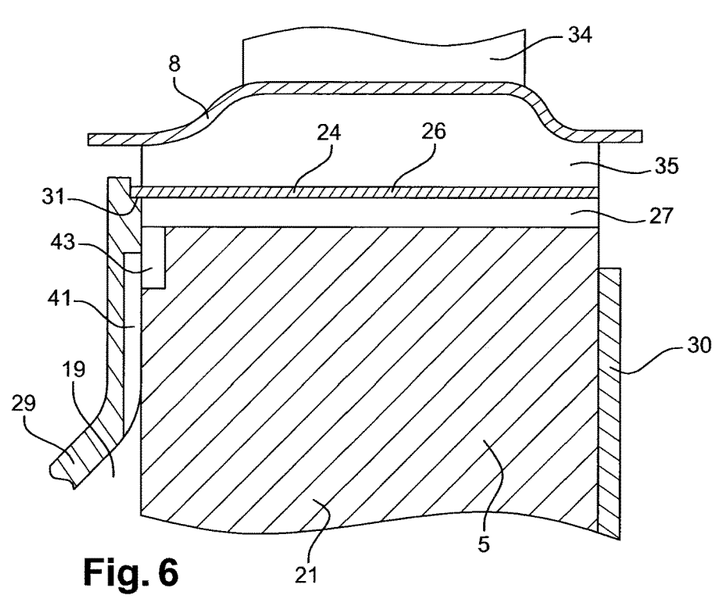
FIG. 6 is a view corresponding to FIG. 4, of a third embodiment of the invention.
Figure 7:
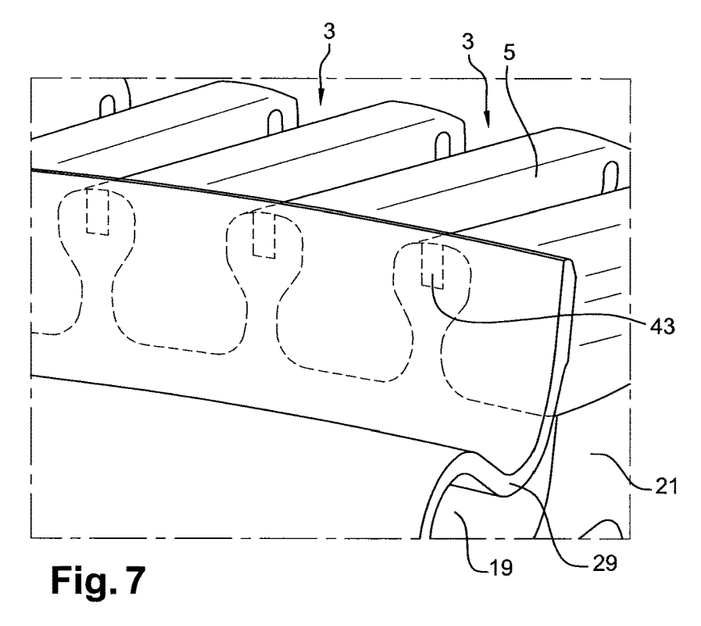
FIG. 7 is a perspective view of a part of the rotor of FIG. 6.
Figure 8:
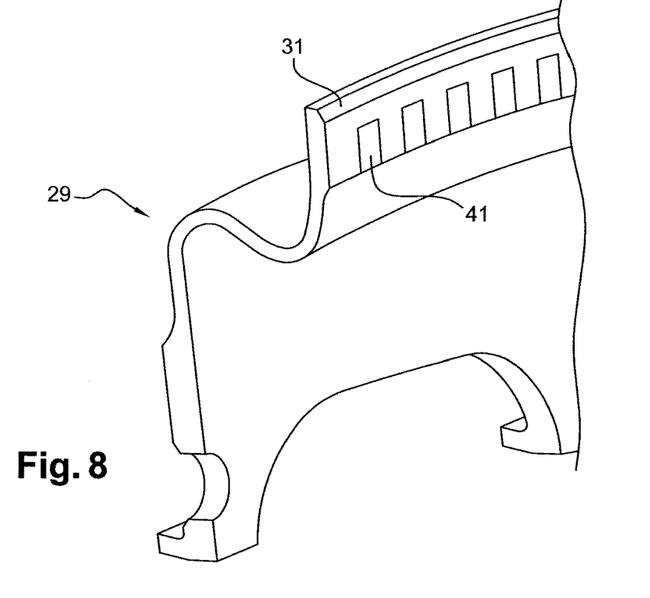
FIG. 8 is a perspective view of a portion of an annular shroud belonging to the rotor of FIGS. 6 and 7.

FIGS. 6 to 8 illustrate a third embodiment of the invention, wherein each cavity 27 radially opens downstream, with the downstream shroud 30 no longer closing the cavity.

The upstream shroud 29 also comprises radial grooves 41 opening, on the one hand, into the annular space 19 and, on the other hand, opposite the grooves 43 provided in the teeth 5 of the disk 21. The latter in turn open into the upstream portion of the cavities 27.

The grooves 41 of the shroud 29 and/or the grooves 43 of the disk 21 are so calibrated as to control the cooling air flow rate.

The grooves 41 may of course lead directly into the cavities 27. In this case, the teeth 5 have no groove 43.

In operation, the air from the annular space 19 goes through the grooves 41, 43 and into the cavities 27 where it cools the peaks of the teeth 5 of the disk 21, prior to being discharged through the downstream open ends of the cavities 27.

Figure 9:
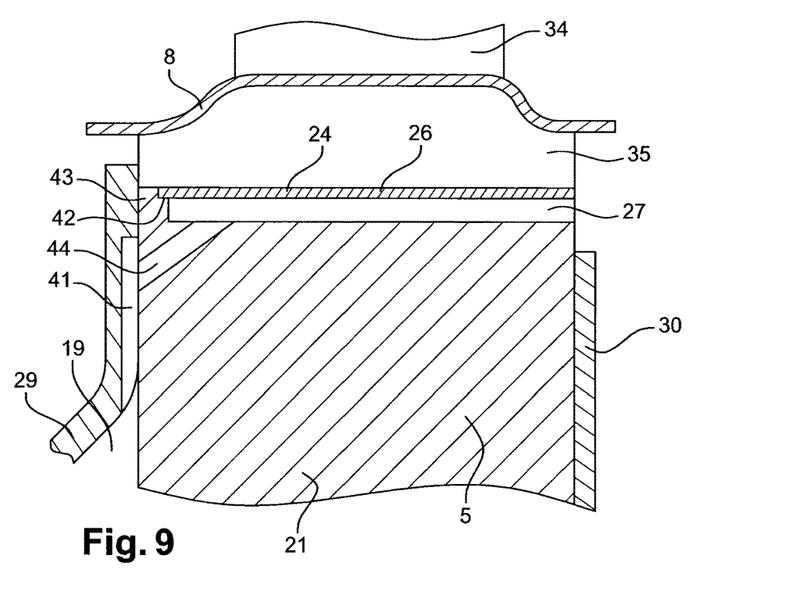
FIG. 9 is a view corresponding to FIG. 4, of a fourth embodiment of the invention.

FIG. 9 illustrates a fourth embodiment of the invention, which differs from those of FIGS. 6 to 8 in that orifices 44 able to bring the cooling air from the grooves 41 of the shroud 29 into the cavities 27 have been substituted for the grooves 43 of the disk 21. The orifices 44 are oriented obliquely to the radial plane and with respect to the axis of the turbomachine.

All the alternative embodiments of the invention make it possible to bring cooling air directly in contact with the peaks of the teeth 5 of the disk 21 so as to better control the temperature of these areas which are submitted to significant shear stresses. All creep phenomenon and premature degradation of the disk 21 are thus avoided. Such embodiments also make it possible to limit and efficiently control the cooling air flow rate, so as not to affect the performances of the turbomachine.

The invention claimed is:

1. A turbine rotor for a turbomachine, comprising:
a disk containing slots for mounting blade roots of blades, with each slot being defined by two adjacent teeth of the disk, with the blade roots comprising contact surfaces bearing on contact surfaces of the teeth of the disk,
wherein foils are mounted on the teeth of the disk, with each foil having a general U-shape comprising first and second lateral bearing parts inserted between the corresponding contact surfaces of the blade roots and the teeth of the disk, and a central part connecting the first and second lateral bearing parts, facing a peak of the corresponding tooth of the disk, and defining a cavity between said peak and the foil,
wherein each of the first and second lateral bearing parts includes an outer surface abutting the corresponding contact surface of the blade root, and an inner surface abutting the corresponding contact surface of the corresponding tooth of the blade, and
wherein the turbine rotor further comprises:
a device for supplying cooling air into said cavity, and
a downstream shroud pressed against a downstream face of the disk so as to close, downstream, the cavities located between the teeth of the disk and the foils, with said downstream shroud having orifices for discharging air out of said cavities.

2. The turbine rotor according to claim 1, wherein the central part of the foils comprises an orifice for letting the cooling air through, with the device for supplying cooling air being adapted to supply cooling air radially outside the foil so that air goes through said orifice of the foil, before entering the cavity located between the corresponding tooth and the foil and impacting the peak of the tooth.

3. The turbine rotor according to claim 2, wherein the blades each comprise a platform carrying a blade and connected via a tang to the blade root, with the tangs defining therebetween spaces for accommodating dampers intended to rub on radially inner faces of the platforms of the blades to dissipate the vibration thereof, with the dampers forming cavities open in the upstream direction and open radially inwards, opposite the orifice of the foil, with cooling air being supplied from upstream into the cavities formed by the dampers and into the cavities formed between the foils and the teeth of the disk, through the orifices of the foils.

4. The turbine rotor according to claim 3, wherein the disk comprises an upstream flange surrounded by an annular shroud which defines, with the flange, an annular space for the circulation of cooling air, with the annular shroud having a downstream portion bearing on an upstream face of the disk and forming a stop for holding the blade roots, with said downstream portion comprising channels supplying cooling air connecting the annular space defined between the upstream flange and the annular shroud and the cavities formed by the dampers.

5. The turbine rotor according to claim 4, wherein an upstream shroud closes, upstream, the cavities formed by the dampers, with the air supplying channels of the downstream portion of the flange only opening upstream of the cavities formed by the dampers.

6. The turbine rotor according to claim 1, wherein the disk has an upstream flange surrounded by an upstream annular shroud which defines, with the flange, an annular space for circulating cooling air, with the annular shroud having a downstream portion resting on an upstream face of the disk and forming a stop holding the blade roots, with said downstream portion comprising cooling air supplying channels connecting the annular space defined between the upstream flange and the annular shroud and the cavities formed between the foils and the teeth of the disk.

7. The turbine rotor according to claim 6, wherein the disk comprises cooling air supplying channels connecting the channels of the downstream portion of the annular shroud and the cavities formed between the foils and the teeth of the disk.

8. The turbine rotor according to claim 6, wherein the channels supplying cooling air to at least one of the annular shroud and the disk are dimensioned to control the cooling air flow rate.

9. A turbomachine comprising a turbine rotor according to claim 1.

10. The turbine rotor according to claim 1, wherein each tooth of the disk includes a circumferential portion, and radially extending portions extending radially inward from the circumferential portion, and
   wherein the central part of each foil includes a first portion facing the circumferential portion of the tooth, and radially extending portions extending radially inward from the first portion of the central part.

11. The turbine rotor according to claim 1, wherein the disk includes an upstream annular flange and a downstream annular flange, and the turbine rotor is a low-pressure turbine rotor.

12. The turbine rotor according to claim 1, wherein the cooling air is taken from a compressor of the turbomachine.

* * * * *